Jan. 21, 1958 A. C. ROTH ET AL 2,820,238
WIPERS FOR WINDSHIELDS SEVERELY CURVED IN PART
Filed March 23, 1955 3 Sheets-Sheet 1

INVENTORS.
Arthur C. Roth
(Laura C. Roth, administratrix)
John W. Merriott &
By:- Earl Applegate.
Louis Robertson Atty.

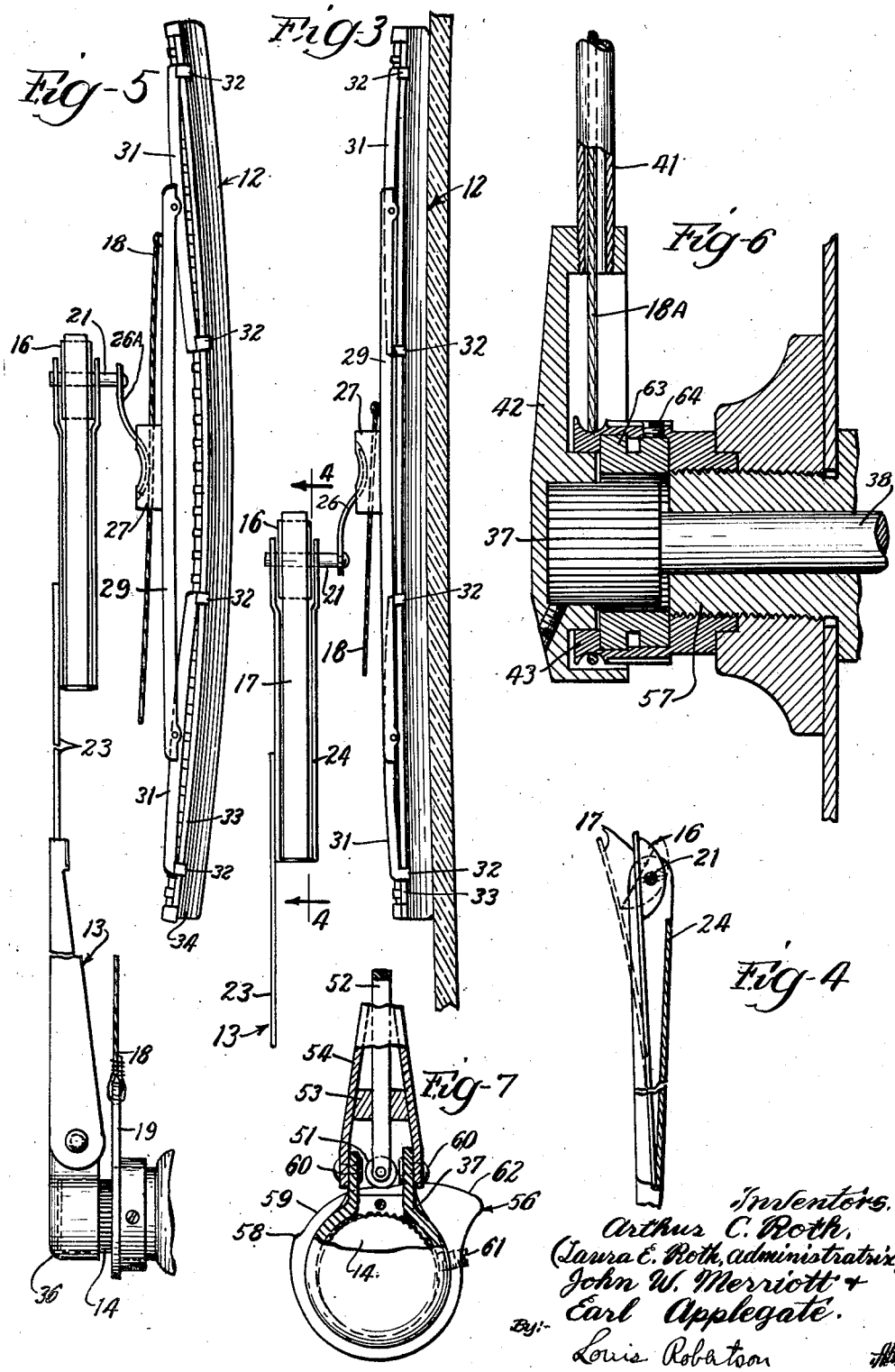

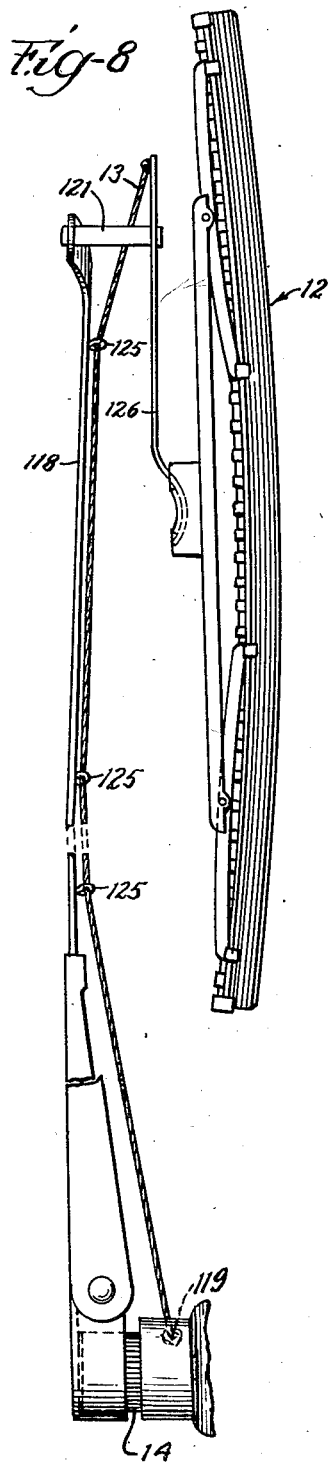
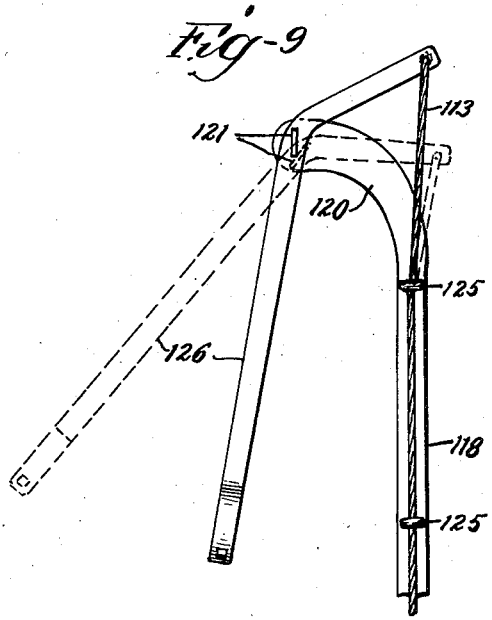
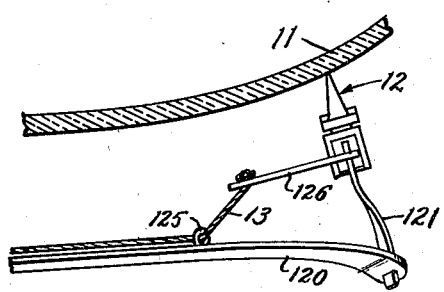

United States Patent Office 2,820,238
Patented Jan. 21, 1958

2,820,238

WIPERS FOR WINDSHIELDS SEVERELY CURVED IN PART

Arthur C. Roth, deceased, late of Lebanon, Ind., by Laura E. Roth, administratrix, and John W. Merriott, Lebanon, and Earl Applegate, Frankfort, Ind.

Application March 23, 1955, Serial No. 496,206

3 Claims. (Cl. 15—255)

For some years curved windshields have presented problems to designers of windshield wipers. Solutions to the problem which were fairly satisfactory on the moderately curved windshields have been entirely inadequate for the more recent "wraparound" windshield, which is severely curved at the outer ends. The problem is made more difficult by the commercial necessity of using a windshield wiper operated from a simple rotary shaft on the end of which the windshield wiper arm is mounted, as in windshield wipers which have now been conventional for some years. Of course, there are other factors to be considered too, such as minimum obstruction of visibility and minimum over-all cost.

According to the present invention, a greatly improved windshield wiper for the type of windshield mentioned is provided by the simple expedient of pivoting the blade with respect to the arm during the latter half of the swing of the arm. This can be accomplished with a very simple mechanism. The wiper may work in the conventional way during the inner half of the swing of the arm. Here the blade stays nearly parallel with the arm, so that when the wiper is turned off, the blade will fit snugly against the bottom of the windshield. The shape of the central half of the windshield has not been changed greatly, and windshield wiper blades are known and commercially available for satisfactorily operating on the moderate curvatures there encountered.

From about the position where the windshield wiper reaches a vertical plane to the outside end of the stroke, the present invention contemplates that it will be pivoted on its arm so as to remain in approximately vertical planes, or in such other planes as intersect the windshield on lines having such moderate curvature that the available wiper blades will accommodate themselves to this curvature satisfactorily.

Additional objects and advantages of the invention will be apparent from the following description and from the drawings.

Designation of figures

Fig. 3 is a fragmentary side view of a form of the invention chosen for a principal illustration, as applied to a windshield shown in cross-section.

Fig. 4 is a fragmentary detailed sectional view, taken approximately on the line 4—4 of Fig. 3, showing the cam and spring for biasing the windshield wiper blade toward its normal angularity with the arm.

Fig. 5 is a view illustrating a modification in which a longer wiper arm is used for greater effective length of radius in the outer part of the stroke, although its effective length during the inner part of the stroke is the same as in Fig. 3,. Fig. 5 also indicating other conventional details which have been found to be satisfactory.

Fig. 6 illustrates a modification in which the control cable is wrapped around a drum.

Fig. 7 illustrates a further modification in which the control is by means of a push rod carrying at its lower end a roller running on a cam.

Figs. 8, 9 and 10 are views of another modification of the invention, in which a flat spring replaces the more ordinary type of pivotal connection of the other forms.

Although the law requires a full and exact description of at least one form of the invention, such as that which follows, it is, of course, one purpose of a patent to cover each new inventive concept therein no matter how it may later be disguised by variations in form or additions of further improvements; and the appended claims are intended to accomplish this purpose by particularly pointing out the parts, improvements, or combinations in which the inventive concepts are found.

General description

Figure 1:
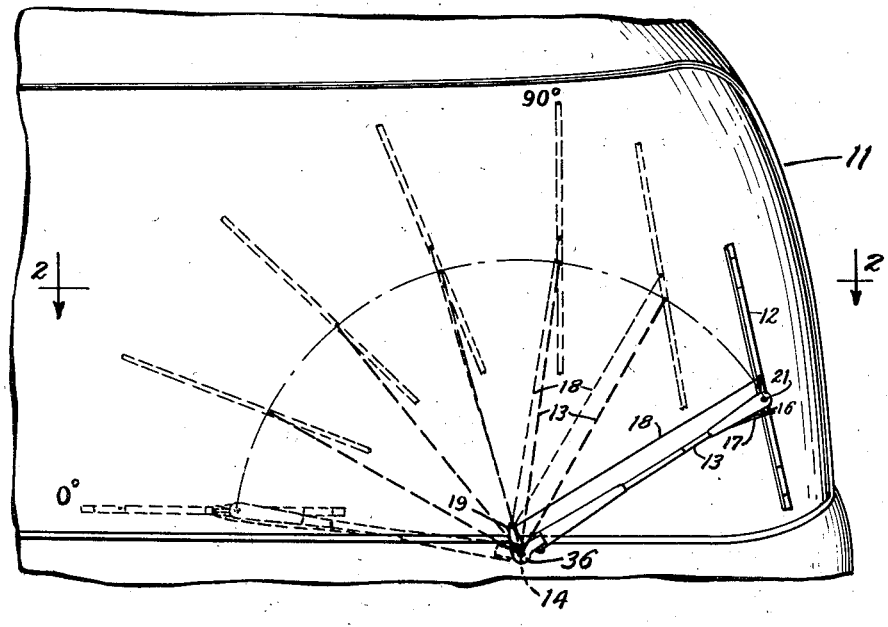
Fig. 1 is a diagrammatic view illustrating one example of the various positions which a windshield wiper embodying this invention might assume in the course of its stroke.
Figure 2:
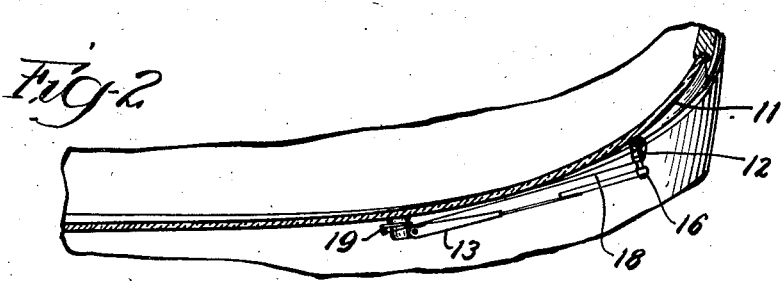
Fig. 2 is a generally horizontal view taken approximately on the line 2—2 of Fig. 1 for illustrating especially the type of curvature of the windshield which presents the problem solved by the present invention.

The windshield wiper of Figs. 1 and 2 has been illustrated operating on a windshield 11 of the "wraparound" type, which is characterized by severe curvature at its ends in a generally horizontal plane. In other respects it has only moderate curvature. Figs. 1 and 2 are intended to be merely illustrative, and not to accurately depict any particular windshield shape.

The wiper blade 12 is pivotally carried by a wiper arm 13 which is carried by and swung from side to side by an oscillating shaft 14, which may be oscillated by conventional oscillating mechanism. The cam 16, engaged by a spring 17, urges the blades 12 toward its normal position of approximate alignment with the wiper arm 13. This angularity is preferably retained from the idle or zero position, marked "0 Degrees" to approximately the 90° position. As the wiper arm 13 moves further toward the outer end of the windshield, cable 18, having its lower end fixed to a bracket 19 and its upper end fixed to a point on the wiper blade 12 above the pivotal point 21, restrains the wiper blade sufficiently to cause it to pivot with respect to the arm 13. It is at present preferred that the pivoting be such as to maintain the wiper 12 in vertical planes as the arm 13 swings out beyond the 90° position. Exactness is not necessary. In fact, it is quite possible that with some windshield shapes, other angularities will be considered more desirable. The most important factor is that the angularity be such that the successive lines of engagement of the wiper blade on the windshield have only moderate curvature within the satisfactory functional ability of the wiper blade 12.

Detailed description

The form of the invention mainly illustrated has been chosen for illustration because it has been tried out and found satisfactory. However, in many of its features it is conventional. For example, the wiper blade assembly 12 is a commercially available wiper blade. Likewise the wiper arm 13 is a commercially available wiper arm except for modification of its upper end.

This particular conventional form of wiper arm includes a flat strip 23 of spring steel. According to the present invention, this is modified at its upper end by securing to it a channel-shaped housing 24. The pivot pin 21 extends through the front and rear walls of this channel-shaped housing and has cam 16 fast thereon. Leaf spring 17 is secured firmly in the region of its base to the lower end of housing 24, so that the upper end of leaf spring 17 is free to spring in and out and bears with resilient firmness against the cam 16. The cam 16 is flattened on the side which engages spring 17, and hence it need not be considered a cam. The spring bears against both ends of this flattened side except when the tension on cable 18 pulls the wiper blade 12 away from its normal angularity with respect to wiper arm 13. Thus the upper corner of cam 17 serves merely as a stop, the spring action being applied against its lower corner which could be a separate lever.

The pin 21 carries a connector link 26 fast on the pin 21. The free end of the connector link 26 is shaped conventionally to fit within connector head 27 mounted on blade 12. Parts 11 and 12 interfit in a manner to permit a rocking movement by sliding along the arcuate end of connecting link 26, while preventing or restricting all other arcuate movement.

The illustrated form of wiper blade assembly, which adapts itself to moderate windshield curvature, is best seen in Fig. 5. Connecting head 27 rigidly carries a channel-shaped beam member 29, to opposite ends of which are pivotally connected beam members 31. Each of the beam members 31 has at its opposite ends fingers 32 which engage and confine a flexible backbone 33 by which the rubber squeegee 34 is carried. It will be observed that the four sets of fingers 32 apply equal pressure at four approximately evenly-spaced points, so that, with the help of the resiliency of backbone 33, pressure is applied to the glass of the windshield quite uniformly along the length of the squeegee 34. The unstressed shape of backbone 33 is approximately that shown in Fig. 5, so that it is resiliently flexed when the windshield is engaged as in Fig. 3. The arm 13 preferably includes at its lower end a conventional mounting collar or cap 36 which may be locked on a knurled end 37 of the windshield wiper shaft or spindle 38. Preferably the cap 36 has a resiliently biased hinge connection with the remainder of arm 13 so as to exert reasonably uniform pressure on the windshield through a substantial angularity of hinging at this point. Some of the new windshield shapes may require a wider angularity of movement with satisfactory tension at this point than have been provided heretofore. This can be provided, if necessary, by changing the spring characteristics, as by lengthening and stiffening the leaf spring which is conventionally provided at this point.

*Modified wiping arc*

It will be observed in Fig. 1 that the bottom of wiper blade 12 is, in the outermost position shown, fairly close to the bottom of the windshield 11. It would strike the bottom of the windshield without much further movement. Some of the inventions contemplated at present, and which may be preferred, include means for modifying the wiping arc so as to permit a wider swing or to keep the wiped area higher at the outside end of the swing. According to one modification, the lower end portion of wiper blade 12 may be hinged and controlled by the angularity between the wiper blade and the arm 13 so as to fold out of the way when it would otherwise strike the bottom of the windshield. A similar extension may be hinged to the top of wiper blade 12 and controlled similarly to swing into position wiping the windshield above the present end of wiper blade 12 as this wiper blade drops objectionably low below the top of the windshield.

Another and simpler form of modifying the arc of wiping is indicated in Fig. 5 and can best be explained by comparison of Figs. 5 and 3. It will be observed that in these two figures the two windshield wiper blades 12 are shown at the same height. Nevertheless in Fig. 5 the wiper arm 13 extends considerably above that in Fig. 3, and it may be assumed that they would be pivoted on a wiper spindle at the same level. Thus the arm 13 of Fig. 5 is longer than that of Fig. 3. In Fig. 5, however, the connecting link 26-A extends downwardly, instead of extending upwardly, as in Fig. 3. With the two windshield wiper blades both in the normal angularity with respect to their respective arms 13 (approximately parallel), the two arms 13 might be said to have the same effective length, inasmuch as they hold their blades at the same height, or the same radius, from the wiper spindle. However, the Fig. 5 arrangement increases the effective wiper arm length as the blade is pivoted in accordance with this invention, while the Fig. 3 arrangement in effect shortens the radius or effective length of the wiper arm as the same pivoting action takes place. A longer connecting link 26-A than that shown in Fig. 5 would have a greater radius-increasing effect. A length should be chosen which would give the optimum location of the wiped area on the windshield.

*Enclosed cable*

Most of the length of the cable can be enclosed as illustrated in Fig. 6. Here the cable 18-A extends through a tubular arm 41. The tubular arm may be rigid with securing cap 42. Should a hinged relationship between arm 41 and cap 42 be desired, a polished and rounded sliding surface may be provided for cable 18-A or the lower end of arm 41 may be made in the form of a channel-shaped member. In Fig. 6, a drum 43 has been illustrated, around which the cable 18 can wrap itself as the arm 41 is swung by spindle 38. The drum 43 may be anchored permanently, in which case slack would appear in cable 18-A. Preferably, however, the drum 43 has limited rotation and is drawn by a spring in cable-winding direction to keep slack out of the cable. Of course, this spring should be just strong enough to keep the slack out of the cable so that it will not unduly oppose the spring tending to keep the wiper blade at its normal angularity. Movement of the drum 43 in the opposite direction, against its spring, would be limited by a suitable stop so that at the appropriate time the cable would begin to turn the wiper blade with respect to the arm. As explained in connection with Fig. 1, it is contemplated that this would begin as the wiper blade swung out beyond its 90° position.

*Cam-controlled blade*

According to another variation of the invention, the wiper blade may be controlled by a cam as illustrated in Fig. 7. Here a cam-follower roller 51 is carried by a pusher rod 52, which slides in guides 53, forming part of arm 54. The follower roller 51 could ride on a stationary cam 56, which could be secured to the boss 57 (Fig. 6) of the windshield wiper mounting. Rod 52 is square or otherwise prevents twisting.

The cam control has some advantages over the more simple cable control. One advantage is that the cam can be shaped to give a wider variety of turning schedules in the action of the wiper blades. For example, a rise 58 on cam 56 in the lower or rest position of the arm could cock the blade at the right angle for lying snugly at the edge of the windshield. Then the dwell 59 could let the blade lie parallel to the wiper arm through the movement to approximately the 90° position. Thereafter, the curvature of the cam could either keep the blade in the vertical plane or give it any other and perhaps more complex movement that might be optimum for windshield shapes not now envisioned.

In both Figs. 6 and 7, adjustability may be provided. For example, in Fig. 7, the cam 56 may be locked in a variety of positions by a set screw 61. In fact, there could be two cams, one bearing the rise 62 and the other bearing the rise 58, which could be set independently by different set screws.

In Fig. 6, the stop member already mentioned for stopping the cable paying-out movement of drum 43 could act between this drum 43 and a collar 63, which latter could be set at any angular position by a set screw 64.

There may of course be many other variations in the construction of the control devices for controlling the angularity of the blade with respect to the arm. This is true not only in the vicinity of the spindle, where some variations have been illustrated, but also with respect to the upper end of the arm. Indeed, the push rod 52 would naturally operate by pushing, or by a camming action instead of by pulling, as did the cable. Incidentally, the spring could in this instance be a simple coil spring of either helical or spiral form, since it would not need to bring the blade to a predetermined normal angularity by its own action. It could continually thrust the blade in one direction, the normal angularity being determined by the reduced dwell 59 of cam 56. This could be adjusted by means of a length adjustment with respect to the pusher rod 52. The roller 51 is illustrated as cylindrical, but it could be thicker at one end than another if cam 62 engages it at differing distances from rod 52 as the arm hinges at 60. The spring (not shown) at hinge 60 must be strong enough to provide the thrust on cam 56 in addition to the sequeegee pressure.

Instead of a hinge at 60, there could be resilient movement of the wiper blade away from the arm, as by a telescoping action axially of pivot 21, or a hinged action between it and connecting link 26 or 26-A.

Utmost visibility

It is of course important to have windshield wipers provide a satisfactory area of visibility as far around the curve of wraparound windshields as possible. The post at the end of the windshield necessarily comes close to providing a dangerous blind spot. Any extension of this tendency by an area adjacent to the post which is not cleaned by the windshield wiper can be quite dangerous. The invention of this application reduces this danger by extending closer to the outside edges of the windshield a satisfactorily clean area of suitable height.

No attempt has been made to illustrate the greatest proximity of cleaning toward the end of the windshield which can be attained. This will depend on various factors. In fact, the use of the Fig. 5 construction in Fig. 1 would move the wiper blade closer to the end of the windshield. It would be moved still further by adding additional length to arm 13 and the same additional length to the downwardly extending connecting link 26-A, as shown in Fig. 8, other features of the Fig. 8 form of the invention being described below.

Spring-pivoted mounting of blade on arm

Figs. 8, 9 and 10 illustrate another form of the invention in which the windshield wiper 12 is carried by a somewhat different wiper arm 118 in a very special manner. As seen best in Fig. 9, the wiper arm 118 is provided at its free end with a lateral extension 120. To this a flat spring 121 is secured as by welding and it in turn carries a bellcrank type of connecting link 126 firmly secured on spring 121 as by welding. A cable 13 extends from the arm of bellcrank lever 126 through loops 125 carried by arm 118. The other end of cable 113 may be secured to a bracket 119 extending out from the side of the housing for spindle 14. It has been found that nylon cord makes a very good form of cable.

Flat spring 121 serves the functions of both a spring and a pivot. In effect, it is a spring type of pivot. It has very little resiliency in the plane of its broad face, which is generally parallel to the length of arm 118. For twisting actions, however, it has a great deal of resiliency and hence it permits a pivotal movement of wiper blade 12 and connecting link 126 with respect to arm 118. Thus the spring 116 permits the type of pivotal action indicated by Fig. 1.

In addition, the tension of cable 113 in producing the pivotal action indicated causes a different flexing of spring 121. This different flexing and its result are fairly well indicated in Figs. 9 and 10, although exact illustration is not intended and is unnecessary. As indicated by the dotted-line position of the connecting link 126 in Fig. 9, and as perhaps illustrated even more clearly by the end of spring 121, the tension on cable 113 will cause a movement of the end of spring 121 to which link 126 is secured from the full-line position shown in Fig. 9 to approximately the dotted-line position. This is accompanied by a tilting of the spring 121 as seen better in Fig. 10. This tilting is quite advantageous, because it tips the wiper blade toward a position more nearly perpendicular to the portion of the windshield 11 near the end of the windshield, the portion which the wiper 12 will be engaging as it reaches its most canted position.

As seen in Fig. 8, the extension 120 of arm 118 may extend somewhat forwardly, away from the windshield as well as laterally. This permits the spring 121 to be somewhat longer than would otherwise be the case if other dimensions remained the same. The extra length (or more if needed) may facilitate the selection of a spring 121 which will not play out prematurely due to metal fatigue.

It will be observed that the arm 118 is somewhat bowed, a fact which would be more evident if the arm 118 were shown for the entire length thereof. Much of the illustrated degree of the bowed shape would be straightened out in the course of exerting the pressure against the windshield, but enough may remain to help reach around the curve of the windshield without touching the windshield. To this end, more initial curvature could be provided if needed. Also the tubular arm 41 in Fig. 6 could be used in Fig. 8, and in either figure this arm could be bowed to reach further around the windshield curvature.

We claim:

1. A windshield wiper including a wiper arm adapted for mounting on a spindle to be oscillated thereby, a wiper blade carried by the wiper arm and pivotable with respect to it about a pivotal axis moving with the spindle, and control means extending from adjacent said spindle to adjacent said pivotal axis and cooperating with a fixed member adjacent the spindle and an angularity control member associated with the wiper blade for controlling the angularity of the wiper blade with respect to the wiper arm, the cooperation of said control means and said stationary member being non-symmetrical as the wiper arm moves in opposite directions from an intermediate position, said angularity control member being secured to the end portion of the wiper arm by a flat spring offset with respect to the line of force exerted on the angularity control member by the control means and so disposed that said force, while twisting said flat spring to produce pivotal movement, also bends the flat spring in a direction to keep the wiper blade more nearly perpendicular to the engaged portion of the windshield than it would otherwise be.

2. A windshield wiper including a wiper arm adapted for mounting on a spindle to be oscillated thereby, an elongated flat spring secured at one end to said arm near the end thereof with its flat side generally parallel to the length of the arm and with its length extending generally parallel to the spindle, wiper blade mounting means carried by the other end of said flat spring, and control means for applying force to said wiper blade mounting means offset from said flat spring and effective in a direction and location to provide a pivotal movement of said wiper blade mounting means by twisting said spring.

3. A windshield wiper in accordance with the preceding claim in which the effective direction of the force of the control means and its location is such that as it twists said spring, it also flexes said spring in a direction transverse to the length of the arm so that as the wiper blade is pivoted with respect to the arm about an axis generally perpendicular to the arm, it is also canted about an axis generally parallel to the arm to remain more nearly perpendicular to a windshield surface as it moves around the curvature of said surface.

References Cited in the file of this patent

UNITED STATES PATENTS

| | | |
|---|---|---|
| 1,866,700 | Farmer | July 12, 1932 |
| 2,079,399 | Drew et al. | May 4, 1937 |
| 2,336,007 | Fuller | Dec. 7, 1943 |
| 2,356,424 | Paton | Aug. 22, 1944 |
| 2,691,186 | Oishei | Oct. 12, 1954 |